Jan. 10, 1961  J. B. SHINAL  2,967,783
FABRICATION OF IMAGE DISPLAY SCREENS
Filed July 29, 1957  2 Sheets-Sheet 1

INVENTOR
JOSEPH B. SHINAL
BY Robert E. Strauss
ATTORNEY

Jan. 10, 1961  J. B. SHINAL  2,967,783
FABRICATION OF IMAGE DISPLAY SCREENS
Filed July 29, 1957

INVENTOR
JOSEPH B. SHINAL
BY
Robert E. Strausser
ATTORNEY

United States Patent Office 2,967,783
Patented Jan. 10, 1961

2,967,783

FABRICATION OF IMAGE DISPLAY SCREENS

Joseph B. Shinal, Seneca Falls, N.Y., assignor, by mesne assignments, to Sylvania Electric Products Inc., Wilmington, Del., a corporation of Delaware Filed July 29, 1957, Ser. No. 674,969

2 Claims. (Cl. 117—34)

This invention relates to image display screens and more particularly to a method for forming such screens and to an apparatus adaptable for use in the screen fabricating process.

Image display screens of the type employed in color television apparatus generally comprise a transparent viewing panel having a large number of discrete triad patterns formed thereon. Each pattern usually consists of bars, dots or stripes of red, green and blue color fluorescing materials. A screen of this type may be fabricated by a photographic printing technique wherein a photosensitive material is used to bind the fluorescent material to the panel. In such a process, the transparent viewing panel is first coated with a thin film of a photosensitive substance, and a dry powdered fluorescent material is subsequently deposited thereon. The panel is then exposed to light through an appropriate negative to cause the photosensitive material to harden and adhere to the panel. Those portions of the screen which were not exposed to light are subsequently removed by dissolving the material with a suitable solvent. This procedure is repeated for each fluorescent material pattern used in the display device.

In a screen forming process of the type described above, the photosensitive material has heretofore been applied by a manual spraying operation wherein the operator endeavors, through a series of movements, to achieve a uniform photosensitive material coating. However, due to the inherent inaccuracies involved in such a procedure, the photosensitive film has been found to be non-uniform in thickness and in "wetness" over the panel. When the photosensitive film is too wet or too dry in given areas, the powdered fluorescent material will not adhere uniformly over the panel, and a fluorescent material pattern will be formed which is more thick or better adhering in some areas than in others. In addition, if the photosensitive material coating thickness is not uniform, the amount of light needed to harden or make insoluble one portion of this material will not be sufficient to harden other portions. Screens which are fabricated on a panel which has a non-uniformly thick photosensitive material coating produces patterns which are unacceptable since the thick portions of the coating may not completely harden and may therefore be dissolved by the solvent.

Accordingly an object of the invention is to reduce the aforementioned difficulties and to provide improved fabrication procedures for image display screens.

A further object is the production of a high quality image display screen having good fluorescent material pattern uniformity.

Another object is the provision of improved means for fabricating an image display screen.

A still further object is the provision of improved means adapted to be employed in the process of fabricating image display screens.

The foregoing objects, as well as other objects which will be apparent after reading the following description, taken in conjunction with the accompanying claims, are achieved in one aspect of the invention by the provision of a process for fabricating screens wherein the photosensitive material is sprayed upon the panel in a series of spray passes which move back and forth across the panel, the spray device and panel being oriented in a different position relative to one another for each spray pass. An apparatus formed to provide oscillatory movement for the spray device in addition to means for rotating the panel relative to the spray device is provided to facilitate the application of a uniform photosensitive material coating to the panel. After the spraying operation has been completed, the fluorescent material is deposited upon the photosensitive coating and the panel is exposed to light through a negative to form the pattern. A developing fluid is subsequently applied to the panel to achieve removal of the unexposed portions of the photosensitive material. This operation is repeated for each of the color fluorescing materials, with proper offsetting of the light source from the axis of the panel for each exposure operation to produce the complete pattern.

The fluorescent materials employed in the screen may be any conventional type of electric field and/or electron-responsive inorganic material such as those formed from sulfides, oxides, tungstates, aluminates, phosphates, silicates or selenides of one or more metals consisting of zinc, cadmium, beryllium, magnesium, manganese, calcium, strontium and others well known in the art.

The photosensitive or light hardenable substance may comprise any well known formulation which is rendered nondispersible or substantially insoluble in a suitable developing fluid. Among the materials adapted for use in the production of image display screens are photographic gelatins, polyvinyl alcohol, polyvinyl acetate and polyvinyl pyrolidone sensitized with such substances as ammonium, potassium or sodium dichromates, monomeric type dye-sensitized polymers, and a variety of commercial lacquers such as Kodak Photosensitive Lacquer (KPL) and Kodak Photoresist (KPR) which has incrporated therein a volatile sensitizer.

The solvent or developing fluid used in the process is dependent upon the choice of photosensitive material which is employed. For instance, an organic solvent such as trichloroethylene or a ketone may be used with commercial photosensitive lacquers and with polyvinyl acetate whereas other substances such as polyvinyl alcohol are water soluble.

For a better understanding of the invention, reference is made to the following description taken in conjunction with the accompanying drawings in which.

Figures 1, 2:
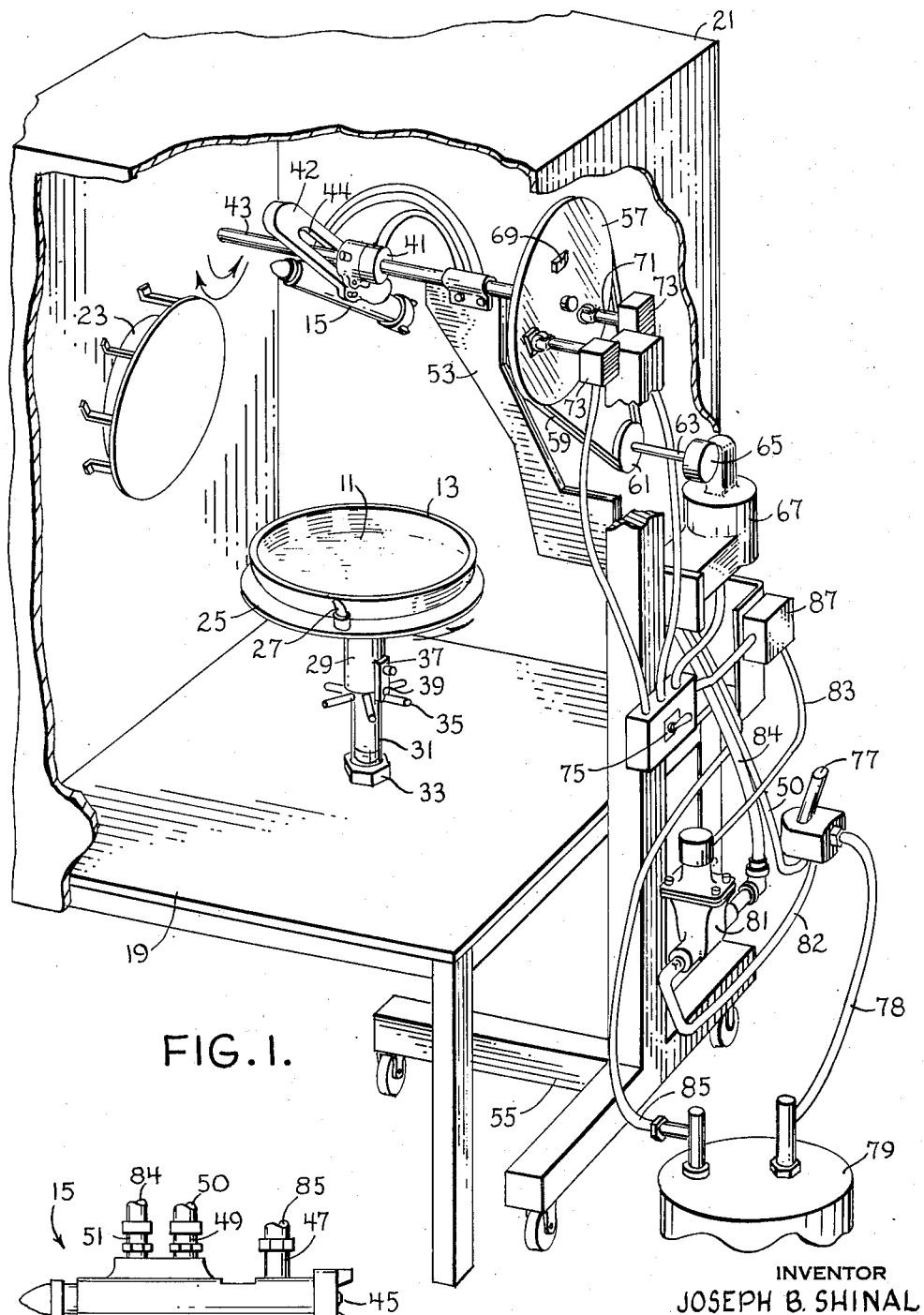
Fig. 1 is a partially cut-away perspective view of a spray apparatus.
Fig. 2 is a plan view of a spray head adapted to be employed with the apparatus shown in Fig. 1.

Referring to the drawings, the screen is formed upon the internal surface of a curvilinear glass face plate 11 of a conventional viewing panel 13 which may be employed in a cathode ray tube. The face plate may be initially flow, spin or spray coated with a bonding substance such as dilute solution of polyvinyl alcohol, which is capable of being rendered light hardenable or photosensitive. This preliminary coating serves to provide good adherence between face plate 11 and the screen material to be later applied. The light hardenable material may be sensitized, if desired, and it may be removed after a prescribed time by a developing fluid such as deionized water. It has been found that even in those instances where the preliminary coating has been rinsed with a developing fluid or solvent, a very thin film remains on the face plate to provide a surface which is capable of bonding the screen pattern to the face plate.

Figure 3:
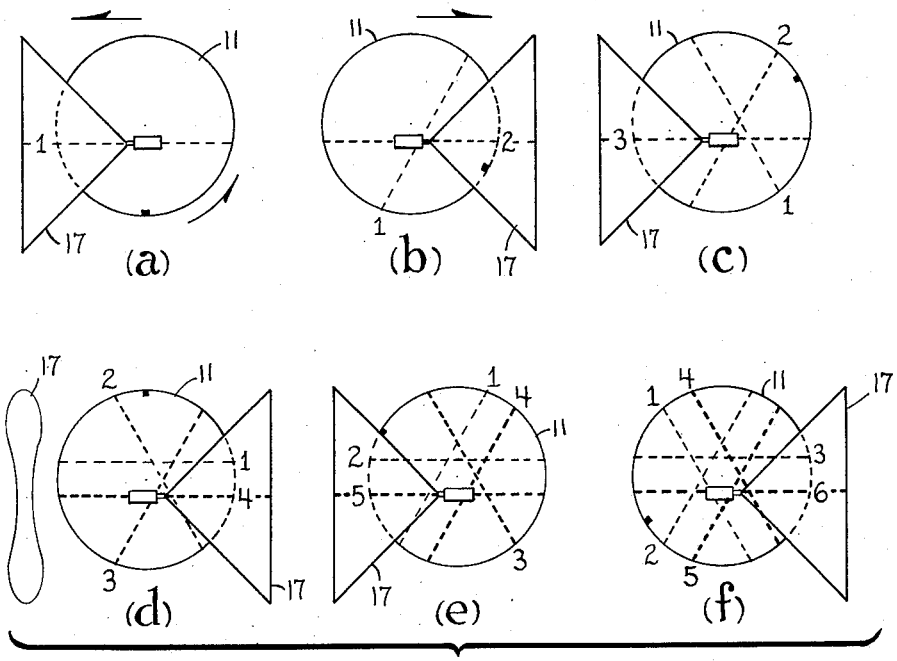
Fig. 3 is a flow diagram of the spray technique used in one aspect of the invention.

After application of the initial coating, the panel is sprayed with a solvent dispersible light hardenable substance such as polyvinyl alcohol sensitized with ammonium dichromate to form a coating which is uniformly thick and uniformly wet over the entire face plate area. The spray device 15 is formed to provide a substantially ellipsoidal diploid pattern 17, Fig. 3d, which has a length larger than the lateral dimension of the viewing panel. The center of spray pattern 17 is offset from the center of the panel to prevent an accumulation of light hardenable material at its mid-portions, and a plurality of spray passes are utilized in a backward and forward motion while providing relative movement between face plate 11 and spray pattern 17 intermediate each reciprocating spray pattern movement. Referring particularly to Fig. 3, it can be seen that the spray pattern travels along its first course, which is offset from the center of face plate 11, to cross the panel from right to left. After this initial pass, panel 13 is rotated approximately 60° counterclockwise and spray device 15 reverses its direction so that spray pattern 17 moves from left to right along a path which is again offset from the center of face plate 11. This procedure may be repeated for a total of six passes, each one being in a direction opposite to the previous pass, and with face plate 11 being rotated approximately 60° intermediate the subsequent spray device movements. The cross-sectional shape of pattern 17 is such that on oppositely disposed passes, e.g. passes 1 and 4, the broader portions of the ellipsoid on pass number 4 covers the panel area which was coated by the more narrow portions of the diploid on pass number 1. Such a procedure provides an even distribution of the coating material. Fig. 3(f) illustrates a summation of the spray pass locations used to complete the sensitized polyvinyl alcohol coating. However, it is to be understood that more or less than six spray passes may be employed, if desired. For instance, it has been found that four passes 90° apart will also provide a uniform coating. However, as the number of passes increases, the thickness of the coating increases and the light sensitive material is more difficult to be made insoluble upon exposure to light. Conversely, as the number of passes decreases, the ability to acquire a uniform coating decreases. In any event, it has been found to be preferable to arrange the direction of spray movement symmetrically about panel 13. The utilization of such a method provides a more uniformly thick and more uniformly wet coating than has heretofore been achieved. Since the spray pattern 17 is larger than panel 13, there is complete coverage on each pass even though the center of the pattern is offset from the center of the face plate. In practice, this method may be efficiently employed by mounting spray device 15 for oscillatory movement about a point which is located at a position approximately the distance of the face plate radius from the face plate and offset a prescribed distance from the longitudinal axis of the panel 13. To provide the relative movement between the panel and spray device 15, the panel may be mounted for rotation about its own axis.

After application of the light hardenable sensitized polyvinyl alcohol coating, a fluorescent material such as the electron excitable green phosphor, zinc ortho-silicate, is applied to the coating. This phosphor may be deposited by a "dusting" technique wherein the phosphor, in dry powdered form, is introduced into the atmosphere above the panel and allowed to settle in a uniform manner upon the tacky surface of the sensitized polyvinyl alcohol. Subsequently, an appropriate negative having a form which will produce the desired bar, dot or stripe pattern configuration, is spaced from the coated panel surface and the photosensitive material and adhering phosphor are exposed through the negative, to light radiating from a point source. Those portions of the screen which have been exposed to light become hardened and adhere to the glass face plate 11. After exposure, the screen is washed with a developing fluid or solvent such as deionized water to remove the unexposed portions of the photosensitive substance and fluorescent material coating.

The above described process may then be repeated with the successive application of red and blue color fluorescing materials, with proper off-setting of the light source relative to the panel axis for each exposure operation. Zinc phosphate is a commonly used red phosphor material while a zinc sulphide has been found to be an acceptable blue phosphor material.

The preliminary coating of polyvinyl alcohol described above is generally only used prior to the application of the first phosphor pattern. That is, a dilute solution of this material is usually not applied intermediate the successive screen pattern forming processes. However, the spray application of sensitized polyvinyl alcohol which serves to form the tacky surface upon which the phosphor materials are deposited, is used to form the surface or adhering medium for each phosphor material employed in the tube.

Referring to Figs. 1, 2, and 3, an apparatus for applying the sensitized light hardenable material is shown comprising a table 19 upon which the panel 13 is positioned, and a hood 21 providing an enclosure wherein the spray coating process is preformed. An exhaust port 23 is formed in one wall of hood 21 to provide an escapement for the fumes generated during processing. Panel 13 is positioned upon a holder or rotatable plate 25 and is held thereto by means of friction devices 27. This plate is mounted upon the upper surface of sleeve 29, which is telescoped over shaft 31. A nut 33 is threaded upon the lower portion of shaft 31 to position plate 25 upon table 19. This threadable engagement allows panel 13 to be raised or lowered relative to device 15. A plurality of positioning pins 35 are mounted upon the shaft to extend radially outward therefrom in a symmetrical orientation about the peripheral surface thereof in accordance with the symmetrically disposed spray pass directions illustrated in Fig. 3. A spring loaded locking device 37, which is biased downwardly, is slidably mounted upon sleeve 29 so that the lower curvilinear surface 39 cooperates with pins 35 to hold panel 13 at each prescribed position. In operation, the panel is rotated from one pin position to the next after each reciprocating movement of the spray device 15. During this movement, the edge of locking device 37 rides over the pin and surface 39 slides into engagement with the pin. Therefore, after the panel has been positioned upon rotatable plate 25, and after one spray pass has been made, the panel is rotated approximately 60° to the following pin location in readiness for the reciprocating spray pass.

Spray device 15 is mounted above panel 13 by means of cylinder 41, bracket 42, and shaft 43. The spray device is affixed to the shaft so that it may be moved through an oscillating motion back and forth across the panel. The cylinder may be made adjustable upon shaft 43 to provide longitudinal or rotational positioning of the spray device relative to shaft 43. In addition, bracket 42 is provided with a slot 44 to allow movement of the spray device toward or away from panel 13.

Referring to Fig. 2, spray device 15 is shown, by way of example, as an externally mixed pressure type feed gun having a nozzle 45, fluid intake port 47, process air intake port 49 and an air control port 51. The spray gun employs a needle valve which is controlled by the air pressure connected through port 51 to regulate the operation of the device. This control air pressure is intermittently applied to the needle valve while the process air and fluid are continuously applied to the gun. During the photosensitive material coating operation illustrated in Fig. 3, the needle valve allows the spray fluid to issue from nozzle 45 only during the oscillatory movement of device 15. However, it is to be understood that a continuously operating spray device may be employed, if desired. Also, spray guns which operate upon principles other than air pressure may be utilized in the apparatus.

A brace 53, which is mounted upon a movable support frame 55, serves to position shaft 43 and its attached cam wheel 57. The cam wheel is connected through belt 59 to a driving wheel 61, which has a drive shaft 63 connected to a gear reduction coupling 65 and a reversible electric motor 67. When in operation, the motor will cause rotation of shaft 63 to impart movement to cam wheel 57 and thereby cause spray device 15 to make a spray pass in one direction. After the spray device has reached the limit of its travel in one direction, the motor will be stopped in a manner to be hereafter described. Subsequently, the motor will be reversed in direction to cause spray device 15 to reciprocate.

Figure 4:
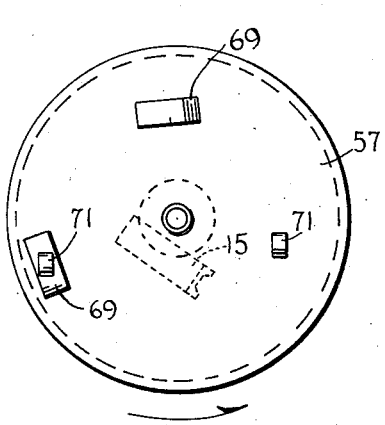
Figs. 4 and 5 illustrate two positions of the spray head during movement thereof in the screen forming process.
Figure 5:
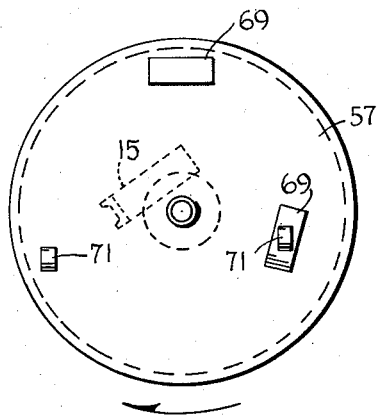

The limit of movement of spray device 15 in either direction is controlled by the rotatably mounted cam wheel 57, which is provided with raised cam surfaces 69 formed to operate upon and press inwardly the plungers 71 of micro-switches 73. A series electrical connection may be provided between the motor 67, each switch 73 and each position of an appropriately connected double pole, double throw switch 75 so that the motor circuit will be opened when the appropriate plunger 71 rides upon cam surface 69 to thereby stop movement of spray device 15. Throwing the position of switch 75 to the opposite direction to connect the opposite switch pole will energize the motor windings to cause rotation in the opposite direction so that spray device 15 will reciprocate to the point where the other cam surface 69 moves beneath the other plunger 71 to again open the motor circuit. Figs. 4 and 5 illustrate the relative positions of the spray device and cam surfaces 69, and the manner in which cam wheel 57 rotates to bring the cam surfaces under plungers 71 to limit the travel of the spray device during its oscillatory motion.

The air pressure utilized in the apparatus has an inlet 77 which leads through line 78 to a fluid tank 79, to an electrically operated solenoid valve 81 through line 82, and to the process air intake port 49 through line 50. Air pressure is continuously maintained at tank 79 and at port 47 whereas the air supplied to control port 51 is intermittently applied by the valve 81 through line 84. When switch 75 energizes motor 67 in either direction, it also energizes valve 81 through electrical lead 83 to provide spray operation of device 15. When the appropriate switch 73 is opened by cam surface 69, the electrical solenoid valve is also de-actuated to stop the spray flow of polyvinyl alcohol. The fluid is continuously supplied to intake port 47 of spray device 15 through line 85. Electrical connections are made to motor 67, valve 81 and switch 75 from a junction box 87.

The apparatus shown in Fig. 1 serves to coat panel 13 with a uniform layer of the photosensitive material. With the panel in the position shown, switch 75 is moved to the right to complete the series circuit through motor 67, and valve 81 to thereby start the motion of the spray device and initiate the flow of spray fluid from nozzle 45. When the spray device reaches the end of its travel, the cam surface 69 has moved beneath plunger 71 to open the series circuit and thereby stop the operation of the motor and the spray device. Panel 13 is then rotated to the next position where locking device 37 moves into cooperation with the next positioning pin 35. The switch 75 is then thrown in the opposite direction to again energize motor 67 and device 15 to repeat the spray application in a reverse motion. This procedure may be repeated six times in accordance with the process illustrated in Fig. 3.

It is to be understood that the air pressure and fluid systems may incorporate filters, valves, regulators, meters, etc., which will facilitate accurate control of the pressure involved and a high degree of purity for the photosensitive material used in the process.

Although several embodiments of the invention have been shown and described, it will be apparent to those skilled in the art that various changes and modifications may be made therein without departing from the scope of the invention as defined by the appended claims.

What is claimed is:

1. In the method of forming a screen pattern on the curvilinear viewing panel of an image display device having a given radius, the step of spray coating said panel with a photo-sensitized light hardenable substance by making a pass across said panel with an oscillatory, mounted, spray device spaced from the panel approximately the distance of the panel radius and with the spray device mounted eccentric to the center axis of the panel so that the spray pass is made off center of the panel, the step of rotating the panel through a given angle to a fixed position, the step of repeating the spray pass and repeating the rotating of the panel and the passing of the spray over the panel until the panel is completely uniformly coated.

2. In the method of forming a screen pattern on the curvilinear viewing panel of an image display device having a given radius, the step of spray coating said panel with a photo-sensitized light hardenable substance by making a pass across said panel with an oscillatory, mounted, spray device providing a substantially ellipsoidal diploid shaped spray pattern and spaced from the panel approximately the distance of the panel radius and with the spray device mounted eccentric to the center axis of the panel so that the spray pass is made off center of the panel, the step of rotating the panel through a given angle to a fixed position, the step of repeating the spray pass and repeating the rotating of the panel and the passing of the spray over the panel until the panel is completely uniformly coated.

References Cited in the file of this patent

UNITED STATES PATENTS

| | | |
|---|---|---|
| 2,588,125 | Knowland et al. | Mar. 4, 1952 |
| 2,769,733 | Pool | Nov. 6, 1956 |
| 2,779,690 | Gaiser | Jan. 29, 1957 |
| 2,837,429 | Whiting | June 3, 1958 |

FOREIGN PATENTS

| | | |
|---|---|---|
| 713,908 | Great Britain | Aug. 18, 1954 |
| 244,644 | Great Britain | Dec. 24, 1925 |

OTHER REFERENCES

Sylvania Technologist, vol. VI, #3, July 1953, pp. 60–63.